United States Patent
Kajitani et al.

(10) Patent No.: US 9,128,565 B2
(45) Date of Patent: Sep. 8, 2015

(54) ULTRASONIC WAVE TRANSMITTER DEVICE, ULTRASONIC WAVE PROPAGATION TIME MEASUREMENT SYSTEM AND ULTRASONIC WAVE PROPAGATION TIME MEASUREMENT METHOD

(75) Inventors: Hiroshi Kajitani, Tokyo (JP); Junichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 586 days.

(21) Appl. No.: 13/500,066

(22) PCT Filed: Oct. 6, 2010

(86) PCT No.: PCT/JP2010/067518
§ 371 (c)(1),
(2), (4) Date: Apr. 3, 2012

(87) PCT Pub. No.: WO2011/043362
PCT Pub. Date: Apr. 14, 2011

(65) Prior Publication Data
US 2012/0198937 A1    Aug. 9, 2012

(30) Foreign Application Priority Data
Oct. 7, 2009    (JP) .................................. 2009-233893

(51) Int. Cl.
*G01N 29/00* (2006.01)
*G06F 3/043* (2006.01)
(Continued)

(52) U.S. Cl.
CPC ............... *G06F 3/043* (2013.01); *B06B 1/023* (2013.01); *B06B 1/0655* (2013.01); *G01S 11/16* (2013.01); *G06F 3/03545* (2013.01); *G10K 11/002* (2013.01); *B06B 2201/70* (2013.01)

(58) Field of Classification Search
CPC ........ B06B 1/023; B06B 1/0655; B06B 1/08; B06B 2201/70; G01N 29/00; G01N 29/22; G01N 29/2412; G01S 11/16; G06F 3/043; G10K 11/002

USPC ................................ 73/597; 367/128; 702/39
See application file for complete search history.

(56) References Cited

U.S. PATENT DOCUMENTS 4,466,270 A * 8/1984 Kimura et al. ................. 73/1.86
5,750,941 A * 5/1998 Ishikawa et al. ........... 178/19.02
(Continued)

FOREIGN PATENT DOCUMENTS

| JP | 53-065757 A | 6/1978 |
| JP | 61-286782 A | 2/1986 |

(Continued)

OTHER PUBLICATIONS

Yuichiro et al. (English Translation of Japanese Patent Application Publication JP 2003-256135).*

(Continued)

*Primary Examiner* — Laura Martin
*Assistant Examiner* — Samir M Shah
(74) *Attorney, Agent, or Firm* — McGinn IP Law Group, PLLC (57) ABSTRACT

An ultrasonic wave transmitter device includes an ultrasonic wave driving circuit that modulates an ultrasonic wave based on a pseudorandom signal to generate an ultrasonic wave driving signal, and an ultrasonic wave transmitter driven by the ultrasonic wave driving signal to send out an ultrasonic wave signal of a frequency higher than a fundamental frequency of the ultrasonic wave driving signal. The ultrasonic wave transmitter includes a cylindrically-shaped piezoelectric or magnetostrictive element sending out the ultrasonic wave signal and an ultrasonic wave absorber that covers part of a base member holding the piezoelectric or magnetostrictive element.

19 Claims, 8 Drawing Sheets

(51) Int. Cl.
  G01S 11/16 (2006.01)
  G06F 3/0354 (2013.01)
  B06B 1/02 (2006.01)
  B06B 1/06 (2006.01)
  G10K 11/00 (2006.01)

(56) References Cited

U.S. PATENT DOCUMENTS

| | | | | |
|---|---|---|---|---|
| 6,004,269 | A | * | 12/1999 | Crowley et al. ............... 600/439 |
| 6,118,205 | A | * | 9/2000 | Wood et al. ............... 310/316.01 |
| 6,208,062 | B1 | * | 3/2001 | Nysen et al. ............... 310/313 R |
| 6,842,716 | B1 | * | 1/2005 | Leleu ........................... 702/178 |
| 7,132,778 | B1 | * | 11/2006 | Nysen et al. ............... 310/313 D |
| 7,632,235 | B1 | * | 12/2009 | Karicherla et al. ............ 600/526 |
| 8,427,905 | B2 | * | 4/2013 | Miyamoto et al. ............. 367/125 |
| 8,806,947 | B2 | * | 8/2014 | Kajitani ........................... 73/632 |
| 2003/0144814 | A1 | * | 7/2003 | Hama et al. ................... 702/159 |
| 2005/0150740 | A1 | * | 7/2005 | Finkenzeller et al. ........ 194/207 |
| 2008/0319318 | A1 | * | 12/2008 | Johnson et al. ............... 600/445 |
| 2011/0261654 | A1 | | 10/2011 | Miyamoto et al. |

FOREIGN PATENT DOCUMENTS

| | | |
|---|---|---|
| JP | 61-189288 | 11/1986 |
| JP | 61-286782 A | 12/1986 |
| JP | 2-129713 A | 5/1990 |
| JP | JPH 02-128214 A | 5/1990 |
| JP | 2003-256135 | 9/2003 |
| JP | 2003-256135 A | 9/2003 |
| WO | WO 2009/028680 A1 | 3/2009 |
| WO | WO 2009028680 A1 * | 3/2009 .............. G01S 11/16 |

OTHER PUBLICATIONS

Jun Kashiwagi, "M-sequence and its application", Mar. 25, 1996, published by Shokodo.
Japanese Office Action dated Aug. 19, 2014 with a partial English translation thereof.
International Search Report in PCT/JP2010/067518 dated Dec. 28, 2010(English Translation thereof).

* cited by examiner

FIG. 8 though the
ULTRASONIC WAVE TRANSMITTER DEVICE, ULTRASONIC WAVE PROPAGATION TIME MEASUREMENT SYSTEM AND ULTRASONIC WAVE PROPAGATION TIME MEASUREMENT METHOD

REFERENCE TO RELATED APPLICATION

This application is based upon and claims the benefit of the priority Japanese patent application No. 2009-233893 filed on Oct. 7, 2009, the disclosure of which is incorporated herein in its entirety by reference thereto.

TECHNICAL FIELD

This invention relates to an ultrasonic wave transmitter device, an ultrasonic wave propagation time measurement system and to an ultrasonic wave propagation time measurement method. More particularly, it relates to a technique of reducing the reflected wave accompanying the ultrasonic radiation.

BACKGROUND

As a conventional example position detection system that makes use of an ultrasonic wave, an electronic pen system is disclosed in Patent Document 1. This example position detection system includes an electronic pen and a receiver section. The electronic pen transmits an ultrasonic wave signal of a constant waveform at a fixed period and an infrared trigger signal at a fixed period, and the receiver section receives the two signals transmitted. The receiver section determines the position of the electronic pen from an incoming time point of the trigger signal and that of the ultrasonic wave.

PATENT DOCUMENT 1

U.S. Pat. No. 6,118,205

SUMMARY

The entire disclosure of the above Patent Document 1 is incorporated herein by reference thereto.
The following analysis is made by the present invention.
In general, a cylindrically-shaped piezoelectric film, used as an ultrasonic transmitting means, has a region of directivity closely resembling a concentric disc. If, in particular, the film is used in conjunction with an electronic pen, a capacitor microphone or piezoelectric ceramics, as ultrasonic receiving means, is designed in most cases so as to be located within such region of directivity.

A routine piezoelectric element is of the voltage driven type and hence its power consumption is smaller. To provide for a sufficient sound pressure, the piezoelectric element is used in most cases in combination with a resonator of lower acoustic impedance. In exploiting the resonance phenomenon, an ultrasonic wave may be transmitted at a preset phase, a preset frequency and a preset gain. However, for other frequencies, the transmission gain is rather low such that it is difficult to use a variety of modulation systems. In case of using the piezoelectric element alone, it has high mechanical Q and exhibits prolonged residual vibrations. It is thus difficult for the piezoelectric element to transmit an ultrasonic wave that follows up the modulation wave irrespectively of the type of the modulation system used. In addition, since the resonance characteristic is exploited, it may sometimes occur that the resonance frequency or a peak gain thereof is varied appreciably due to slightest deviations of the characteristic or to the shape of the material of the piezoelectric element.

Hence, in these cases, a piezoelectric film of PVDF (polyvinylidene fluoride) with a rather low mechanical Q is used as the piezoelectric element. This piezoelectric film is low in acoustic impedance and has a larger piezoelectric constant, so that a larger sound pressure may be obtained. However, it also has a disadvantage that it is in the form of a film and hence is difficult to be fixed. In case where, with a view to uniform directivity in a two-dimensional plane, the piezoelectric film is worked to a cylindrical shape, and its circular edge part is fully secured, the ultrasonic sound pressure is drastically reduced, even granting that the positioning accuracy may become higher. If, in an attempt to avoid such situation, the film be secured only loosely, uniform directivity may not be obtained because a partial contact state of the piezoelectric film is inevitably produced. In addition, in working the piezoelectric film to a cylindrical shape, a joint portion is produced, with a result that the ultrasonic wave, which should be spread toroidally, may cease to be uniform in a certain direction(s). Moreover, it is necessary to provide a lead wire(s) that supplies electric power to drive the piezoelectric film. Such lead wire may become a factor to disturb axial symmetry, such that, depending on the manner of placing the wire, the partial contact state of the piezoelectric film tends to be accentuated.

On the other hand, if the cylindrically-shaped ultrasonic wave transmitting means is used as an electronic pen, it is not necessarily used in a state upstanding from the two-dimensional plotting plane. Conversely, it is used in most cases in a state inclined with respect to the plotting plane. Although the ultrasonic wave transmitting means is mounted at this time parallel to the two-dimensional plane, the predominant ultrasonic wave transmitting direction may not be parallel to the two-dimensional plane. Specifically, depending on the state of inclination of the electronic pen, as the ultrasonic wave transmitting means, the predominant ultrasonic wave transmitting direction may generally deviate away from the two-dimensional plane relative to the direction of the ultrasonic wave receiving means. Or, the predominant ultrasonic wave transmitting direction may once proceed towards the two-dimensional plane and may then be reflected to approach the ultrasonic wave receiving means only after reflection. If the inclination of the electronic pen is increased, the ultrasonic wave receiving means may be outside the range of directivity of the ultrasonic wave of the electronic pen, in which case the ultrasonic wave propagation time may not be measured accurately and hence the pen plotting position may not be identified. Even if the tilt of the electronic pen is not increased, the ultrasonic wave may be superposed on itself due to reflection thereof by a base member used for securing the cylindrically-shaped piezoelectric film. If, in particular, a method is used in which the correlation between the modulation signal and the reference signal is found to detect a peak of the correlation, thereby calculating the ultrasonic wave propagation time, an error in the so calculated ultrasonic wave propagation time tends to be increased.

It is therefore an object of the present invention to provide an ultrasonic wave transmitting device which uses a piezoelectric or magnetostrictive element as an ultrasonic transmitting means. It is also intended to provide an ultrasonic wave propagation time measurement system and an ultrasonic wave propagation time measurement method. It is aimed at improving (reducing) disturbances in directivity, that is, variations in sound pressure of the ultrasonic wave, so as to enable accurate measurement of the propagation time of a direct wave initially arriving at the receiver section at each period of the ultrasonic wave sent out from the ultrasonic transmitting means. These disturbances in directivity are produced when the piezoelectric or magnetostrictive element is used and worked into a cylindrical shape. It is because axis-symmetry of the element may not be maintained in this case due to joints produced or under the influence of lead wires.

In one aspect, the present invention provides an ultrasonic wave transmitter device including an ultrasonic wave driving circuit and an ultrasonic wave transmitter. The ultrasonic wave driving circuit modulates an ultrasonic wave based on a pseudorandom signal to generate an ultrasonic wave driving signal, and the ultrasonic wave transmitter, driven by the ultrasonic wave driving signal, sends out an ultrasonic wave signal of a frequency higher than a fundamental frequency of the ultrasonic wave driving signal. The ultrasonic wave transmitter includes a cylindrically-shaped piezoelectric or magnetostrictive element sending out the ultrasonic wave signal and an ultrasonic wave absorber that covers part of a base member that holds the piezoelectric or magnetostrictive element.

In another aspect, the present invention provides a method for measuring the propagation time of an ultrasonic wave in a system in which an ultrasonic wave transmitter including a cylindrically-shaped piezoelectric or magnetostrictive element sending out an ultrasonic wave signal and an ultrasonic wave absorber that covers part of a base member that holds the piezoelectric or magnetostrictive element is arranged facing an ultrasonic wave receiver that receives the ultrasonic wave signal. The method includes: sending out an electromagnetic wave signal indicating the transmitting timing, and generating an ultrasonic wave driving signal by modulating an ultrasonic wave with a pseudorandom signal simultaneously with sending out of the electromagnetic wave signal. The method also includes sending out the ultrasonic wave signal of a frequency higher than the fundamental frequency of the ultrasonic wave driving signal, under driving by the ultrasonic wave driving signal; of detecting the electromagnetic wave; and of detecting the ultrasonic wave signal sent out. The method also includes calculating a value of correlation between the ultrasonic wave signal detected and a model waveform which is the same waveform as that of the ultrasonic wave driving signal. The method further includes detecting a principal peak value of the value of correlation calculated and calculating the ultrasonic wave propagation time from a time point of detection of the electromagnetic wave signal and a time point of detection of the principal peak value.

According to the present invention, due to the provision of the ultrasonic wave absorber is provided to cover part of the base member that holds the piezoelectric or magnetostrictive element, it is possible to suppress adverse effects of the reflected wave of a high sound pressure. It is thus possible to reduce an error in measuring the ultrasonic wave propagation time brought about by the inclination of the ultrasonic wave transmitter to provide for speedy accurate measurement of ultrasonic wave propagation time.

PREFERRED MODES

An ultrasonic wave propagation time measurement system according to an exemplary embodiment of the present invention includes an electromagnetic wave transmitting means for transmitting an electromagnetic wave signal representing the transmitting (sending) timing. The ultrasonic wave propagation time measurement system also includes a means for generating a supersonic wave driving signal by modulating an ultrasonic wave with a pseudorandom signal of high autocorrelation, at the same time as the electromagnetic wave is sent out. This generates an ultrasonic wave driving signal. The ultrasonic wave propagation time measurement system also includes an ultrasonic wave transmitting means composed of a piezoelectric element, which piezoelectric element is driven by the ultrasonic wave driving signal to send out an ultrasonic wave signal of a frequency higher than the fundamental frequency of the ultrasonic wave driving signal. The ultrasonic wave propagation time measurement system also includes an electromagnetic wave receiving means for detecting the electromagnetic wave, and an ultrasonic wave signal receiving means for detecting the ultrasonic wave signal sent out. The ultrasonic wave propagation time measurement system further includes a data processing means. The data processing means calculates a value of correlation between the ultrasonic wave signal detected and a model waveform, which is the same waveform as that of the ultrasonic wave driving signal, and detects a principal peak value of the value of correlation calculated. The data processing means also calculates the ultrasonic wave propagation time from a time point of detection of the electromagnetic wave signal and a time point of detection of the principal peak value. The ultrasonic wave transmitting means further includes a cylindrically-shaped piezoelectric element and an ultrasonic absorber.

In the ultrasonic wave propagation time measurement system, the ultrasonic wave absorber is preferably formed of a foaming material.

In the ultrasonic wave propagation time measurement system, the ultrasonic wave absorber is preferably formed of a fiber material.

In the ultrasonic wave propagation time measurement system, the ultrasonic wave absorber is preferably formed in a cylindrical shape.

In the ultrasonic wave propagation time measurement system, the ultrasonic wave absorber is preferably provided on the side the lead wire that supplies power used for driving the cylindrically-shaped piezoelectric element. By providing the same cylindrically-shaped ultrasonic wave absorber in contact with (or adjacent to) the lead wire side of the cylindrically-shaped piezoelectric element, it becomes possible to improve (suppress) disturbance of the directivity of the ultrasonic wave caused by the shape responsible for disturbing the axis symmetry. Moreover, it becomes possible to suppress the adverse effects of reflection.

In the ultrasonic wave propagation time measurement system, the ultrasonic wave absorber is preferably mounted in contact with the cylindrically-shaped piezoelectric element.

In the ultrasonic wave propagation time measurement system, the ultrasonic wave absorber is preferably mounted in contact with approximately one-half or less of the surface area the cylindrically-shaped piezoelectric element.

In the ultrasonic wave propagation time measurement system, the ultrasonic transmitting means further includes a cover, preferably. The ultrasonic wave absorber is preferably arranged between the cylindrically-shaped piezoelectric element and the cover.

In the ultrasonic wave propagation time measurement system, pseudorandom signal with high autocorrelation is preferably an M-sequence signal.

In the ultrasonic wave propagation time measurement system, the frequency of the ultrasonic wave driving signal is preferably approximately one-half of the resonance frequency of the piezoelectric element.

Taking an electronic pen system, as a concrete example, the ultrasonic wave propagation time measurement system will now be explained in detail with reference to FIGS. 1 to 8.

Figure 1:
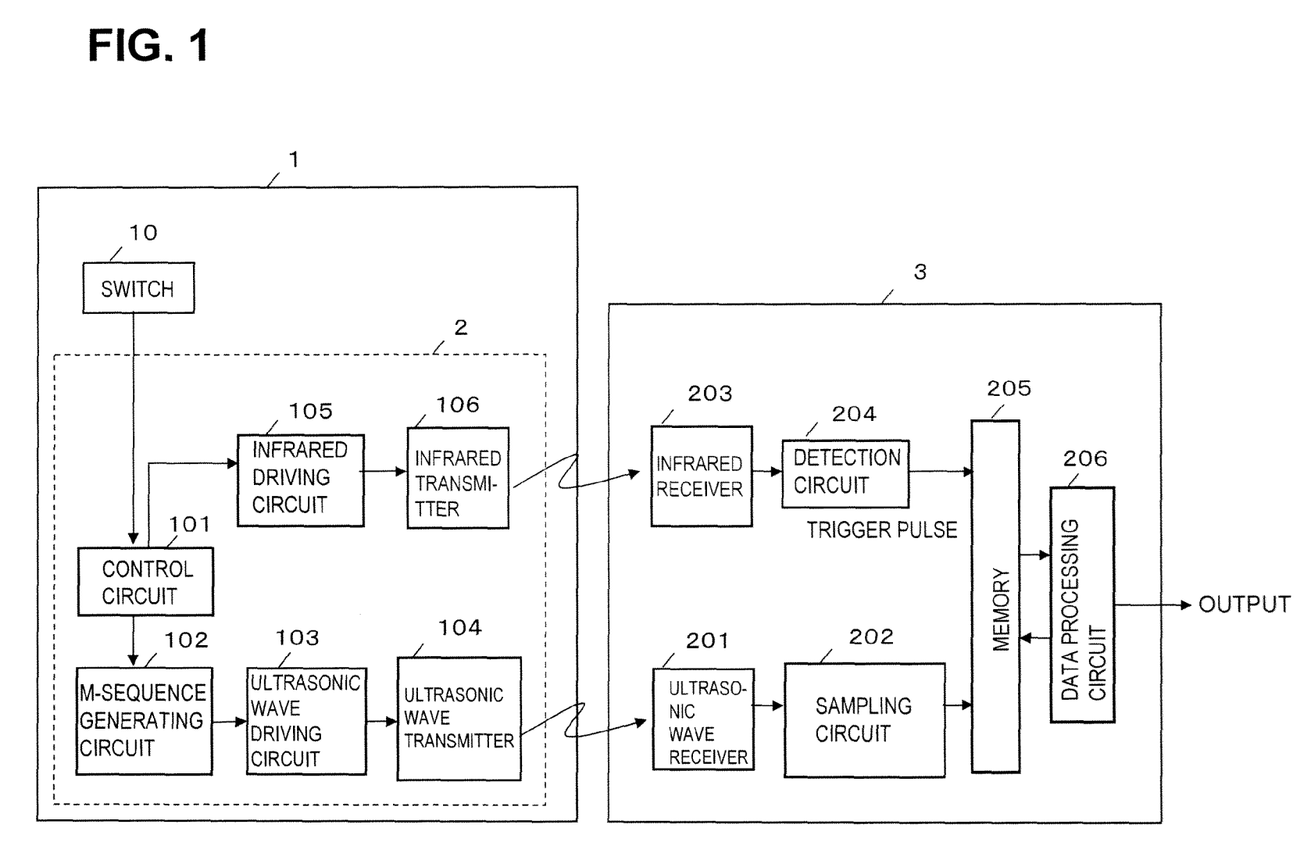
FIG. 1 is a block diagram showing a configuration of an ultrasonic wave propagation time measurement system embodying the present invention.

FIG. 1 shows a configuration of an ultrasonic wave propagation time measurement system according to an exemplary embodiment of the present invention. The ultrasonic wave propagation time measurement system is composed of a transmitter section 2, mounted on an electronic pen 1, having a switch 10, and a receiver section 3 mounted at a preset location spaced from the transmitter section 2. The transmitter section 2 includes a control circuit 101, an M-sequence generating circuit 102, an ultrasonic wave driving circuit 103, an ultrasonic wave transmitter 104, an infrared ray driving circuit 105 and an infrared ray transmitter 106.

Figure 2:
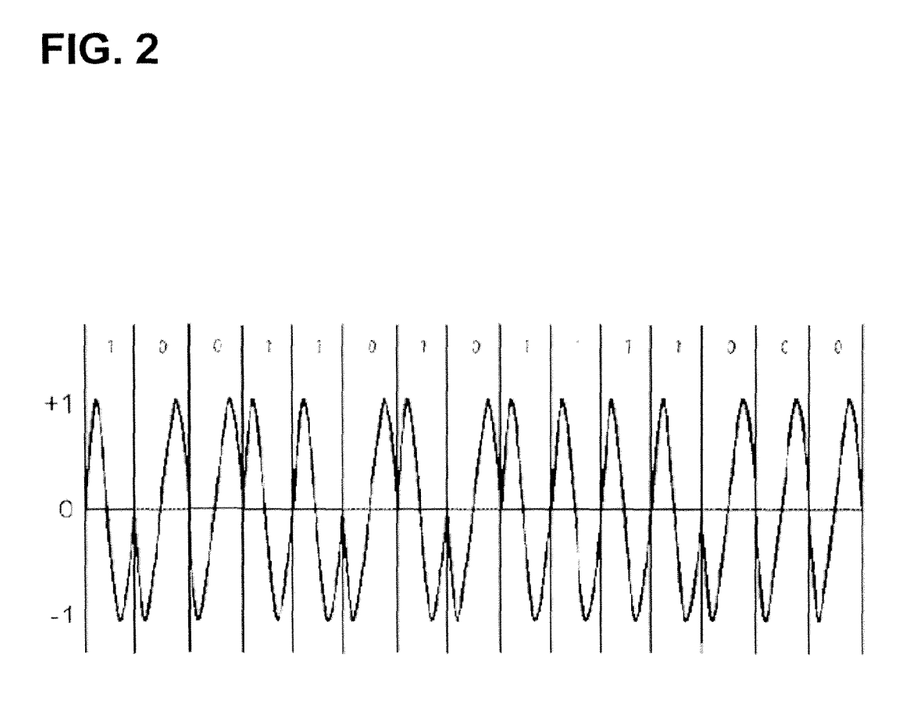
FIG. 2 is a schematic view showing an example waveform of an ultrasonic wave driving signal obtained on phase modulation by an M-sequence.

The M-sequence generating circuit 102 generates an M-sequence determined by a characteristic polynomial based on initial conditions for the M-sequence supplied from the control circuit 101. The M-sequence generating circuit 102 includes a 4-bit shift register having the property of, for example, a four-order characteristic polynomial $f(x)=x4+x+1$ or $f(x)=x4+x3+1$, and generates a bit string having a sequence length of 15 bits. 15 different data with cyclically shifted data arrays may be obtained by changing the initial conditions of the four bits. FIG. 2 shows an example waveform of an ultrasonic wave driving signal phase-modulated with the M-sequence. Each hit of 15-bit M-sequence data '000100110101111' is correlated with one period of a fundamental wave. 0 denotes inverted a phase and 1 denotes forward phase, with a length of a modulation wave corresponding to 15 periods of the fundamental wave. The M-sequence generating circuit 102 may be a memory in which the M-sequence bit string is stored, in which case the bit string is read out from the memory. For details of the M-sequence, reference may be made to, for example, Jun Kashiwagi, 'M-sequence and its application', Mar. 25, 1996, published by SHOKODO.

As for the modulation system of the ultrasonic wave, there is shown a case where the ultrasonic wave is modulated using the M-sequence signal which is a pseudorandom signal having high auto-correlation. However, comparable effects can be expected with the use of other modulation systems. It is sufficient that the signal sequence as the basis of modulation is any signal sequence which is a pseudorandom signal having high auto-correlation, such that similar effects may also be expected from the so-called Gold sequence signal.

When the switch 10 of the electronic pen 1 is pressed, a trigger signal acting as reference of time measurement and a 4-bit data signal for the initial condition of the M-sequence are initially delivered to the infrared (ray) driving circuit 105 and to the M-sequence generating circuit 102. The infrared driving circuit 105 generates an infrared ray driving signal based on the signal or data from the control circuit 101. The infrared (ray) transmitter 106 is driven by an output of the infrared driving circuit 105 to send out infrared ray to a free space via the electronic pen 1.

On the other hand, the M-sequence generating circuit 102 generates a bit string of the M-sequence, based on the initial conditions delivered from the control circuit 101, and delivers the so generated bit string to the ultrasonic wave driving circuit 103. The ultrasonic wave driving circuit 103 phase-modulates the ultrasonic wave signal by this M-sequence to deliver the phase-modulated signal as an ultrasonic wave driving signal to the ultrasonic wave transmitter 104. At this time, a preset frequency characteristic may be afforded to the ultrasonic wave driving signal by a filter, not shown, and the resulting signal may then be delivered to the ultrasonic wave transmitter 104. The ultrasonic wave transmitter 104 is configured as a piezoelectric or magnetostrictive element and driven by the driving signal to send out the ultrasonic wave signal into the free space in synchronization with the transmitting timing of the infrared transmitter 106. The ultrasonic wave signal thus sent out into the free space has been phase-modulated by the M-sequence. Hence, the infrared ray (may be termed "infrared") signal and the ultrasonic wave signal are radiated simultaneously from the electronic pen 1 to the receiver section 3. To have the electronic pen 1 operate as such, the above mentioned sequence of operations is repeatedly carried out at a constant period as long as the switch 10 is pressed.

Since the control circuit 101 is formed by e.g., a CPU, a rectangular wave is preferentially used as each signal waveform. The infrared trigger signal, as the reference for time measurement, is desirably a rectangular wave, as far as possible, in order to reduce time shift relative to sampling on the receiver side so as to reduce a measurement error to a minimum. However, as regards the ultrasonic wave signal, the ultrasonic wave transmitter 104 is mostly implemented as a piezoelectric or magnetostrictive element, and the piezoelectric element itself includes L and C components. Hence, the ultrasonic wave, sent out into the free space, is a pseudo-sinusoidal wave, even though the driving waveform is a rectangular wave. Meanwhile, there is raised no particular problem if the waveform on the transmitting side is a sine wave, a rectangular wave, a triangular wave or a trapezoidal wave, in consideration that the transmitter has the above mentioned characteristics.

The receiver section 3 includes an ultrasonic wave receiver 201, a sampling circuit 202, an infrared receiver 203, a detection circuit 204, a memory 205 and a data processing circuit 206.

The ultrasonic wave receiver 201 is configured as a piezoelectric element, a magnetostrictive element, a microphone or the like, and receives the ultrasonic wave signal transmitted from the electronic pen 1 to convert it into an electrical signal. The sampling circuit 202 samples the ultrasonic wave signal at a preset sampling interval to store the so sampled signal as phase-modulated M-sequence ultrasonic data in the memory 205.

The infrared receiver 203 receives the infrared signal from the electronic pen 1 to convert it into an electrical signal. On receipt of the trigger pulse from an output of the infrared receiver 203, the detection circuit 204 stores the trigger pulse incoming timing in the memory 205. Also, on receipt of the initial condition data for the M-sequence, the detection circuit 204 stores the data in the memory 205.

In lieu of having the initial conditions for the M-sequence included in the infrared signal, it is possible to store in the memory 205 a phase-modulated M-sequence ultrasonic model waveform generated at the outset based on preset initial conditions for the M-sequence. On arrival of the infrared trigger signal, the data processing circuit 206 may read out the M-sequence model waveform.

When the data processing circuit 206 has read out data indicating the incoming of the trigger pulse from the memory 205, the data processing circuit generates the M-sequence ultrasonic model waveform from the initial data for the M-sequence stored. The data processing circuit also phase-modulates the model waveform with the ultrasonic wave by an operation similar to that performed by the transmitter section 2. The data processing circuit thus generates a phase-modulated ultrasonic M-sequence model waveform which is of the same waveform as that of the ultrasonic wave driving signal on the transmitter side. The data processing circuit 206 performs the processing of correlation between the phase-modulated ultrasonic model waveform and the phase-modulated ultrasonic waveform received and stored in the memory 205. On detection of an initial peak of the value of correlation, the data processing circuit 206 calculates the time elapsed as from a time of incoming of the trigger pulse until a time point of detection of the peak of the value of correlation, that is, the time of propagation of the ultrasonic wave from the electronic pen 1 to the receiver section 3.

In more concrete terms, the data processing circuit sets the time point of trigger detection, stored in the memory 205, as a sampling start time point (t), and reads out the phase-modulated M-sequence ultrasonic data from the memory 205. The data processing circuit calculates the value of correlation C(t) at the sampling start time (t) between the data thus read out and the previously generated phase-modulated M-sequence ultrasonic model waveform, in accordance with the equation (1):

$$C(t) = \frac{1}{N}\sum_{i=0}^{N-1} r(i)f(i+t). \quad (1)$$

where i, an integer, is a variable that stands for a sampling time point, N is the number of times of the sampling operations of the model waveform, r(i) is the value of a model waveform at a sampling time point i, and f(i+t) is a value of the received waveform at a sampling time (i+t).

A peak value is then searched from the value of the correlation obtained, the peak value has not been found, the sampling start time (t) is incremented by 1 (a unit value). The data processing circuit 206 then repeats the peak value search in similar manner. On detection of the correlation peak value, the data processing circuit reads out, from the memory 205, a sampling time corresponding to a variable t at the time point of detection of the correlation peak value. Finally, the data processing circuit calculates the propagation time of the ultrasonic wave from the electronic pen 1 to the receiver section 3 based on the trigger detection time point and the peak value detection time point. With a sampling time 0 of receipt of the infrared trigger pulse and with a sampling period DT, the ultrasonic wave propagation time may be calculated as t×DT.

Figure 3:
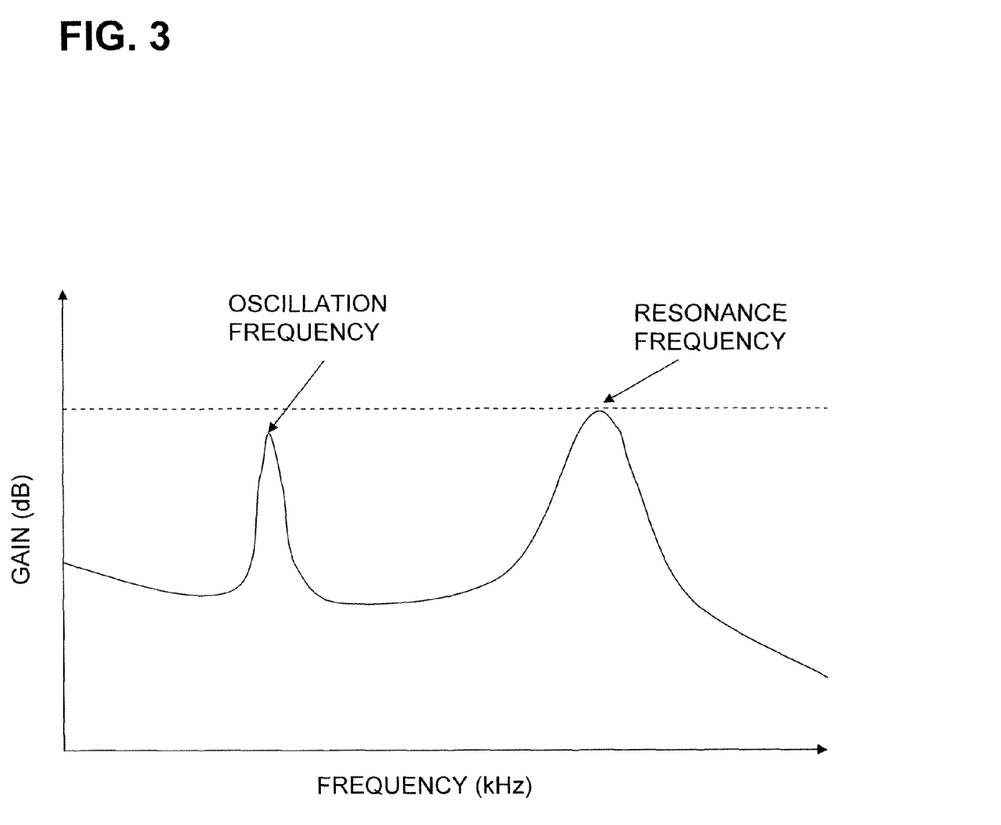
FIG. 3 is a graph showing a frequency characteristic of the ultrasonic wave radiated into a free space.

FIG. 3 shows a frequency characteristic for an ultrasonic wave signal radiated into the free space by applying the ultrasonic wave driving signal to the piezoelectric element of the transmitter 2 in the electronic pen 1. The phase-modulated ultrasonic wave signal, having a broad frequency range, has to be transmitted using a piezoelectric element with a narrow frequency range. Thus, to earn the frequency, even only slightly, the piezoelectric element is driven with a phase-modulated signal of a frequency lower than its resonance frequency. By so doing, it is possible to improve the correlation characteristic of a phase modulated portion and hence the signal discrimination performance. Among the most desirable conditions is such a condition in which the ultrasonic driving frequency (oscillation frequency) is one-half (½) the resonance frequency of the piezoelectric element.

Figure 4A:
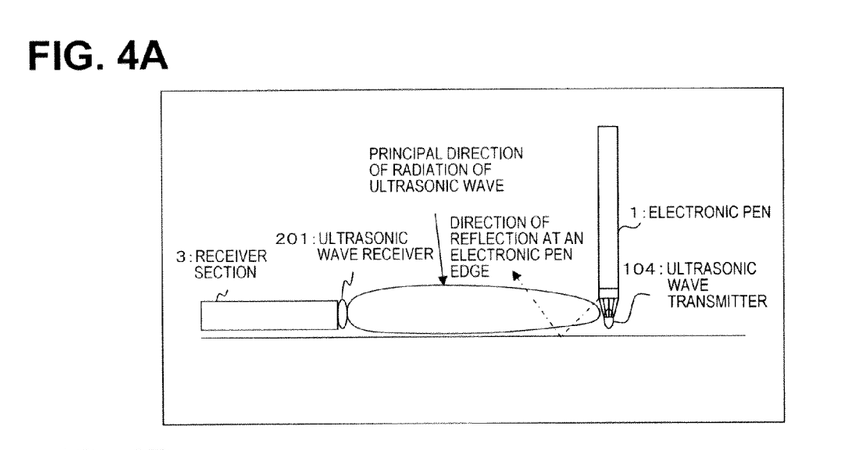
FIGS. 4A to 4C are schematic views showing the relative disposition of an electronic pen and a receiver section.
Figure 4B:
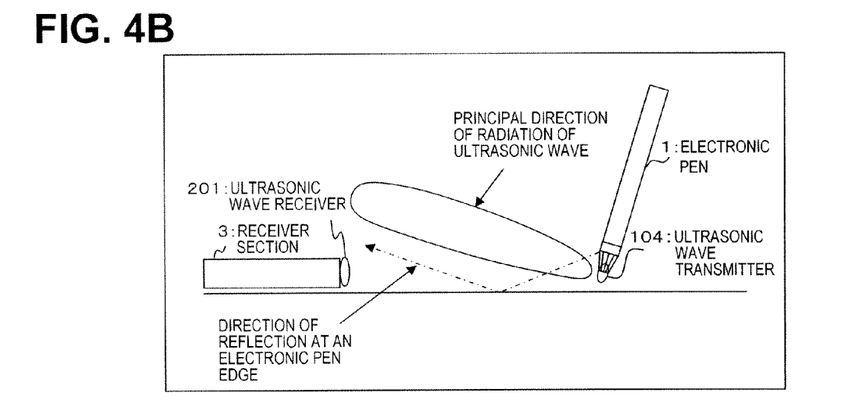
Figure 4C:
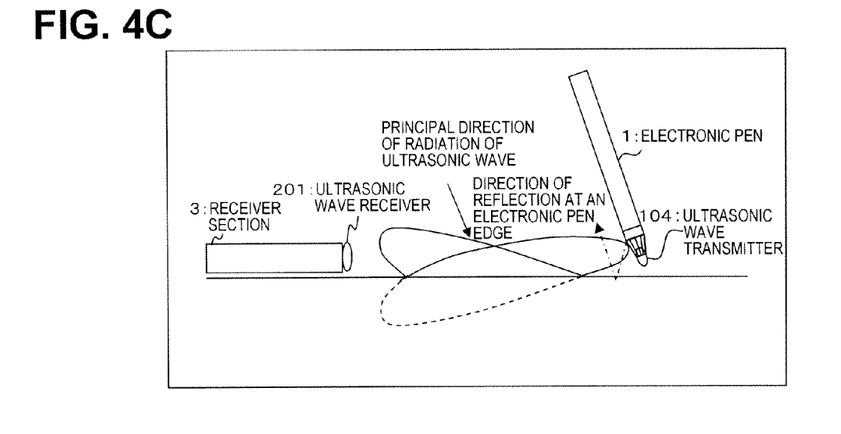
Figure 5:
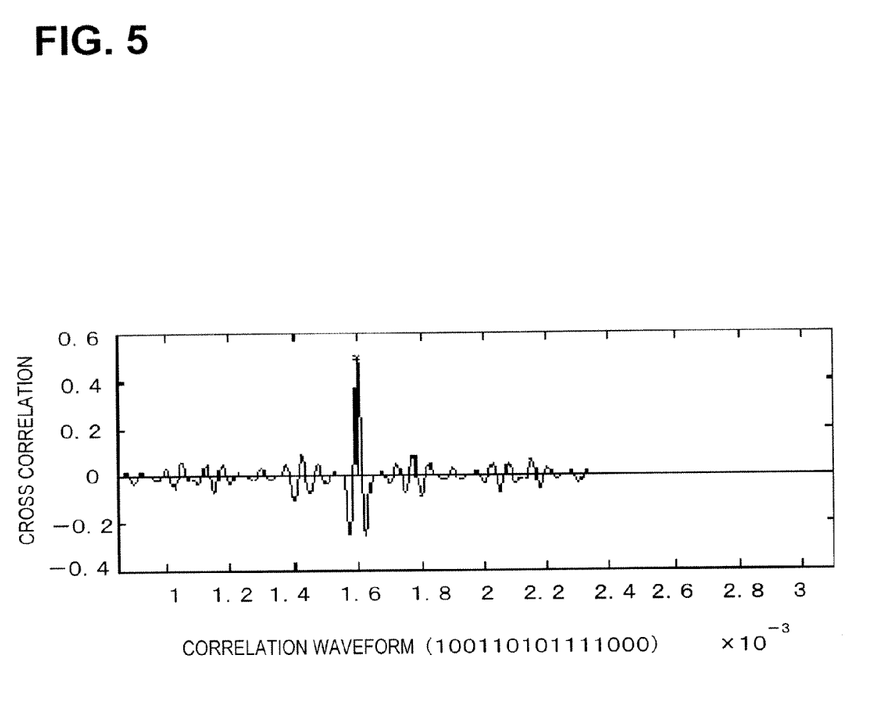
FIG. 5 is a graph showing an example of correlation data under an optimum state of the relative disposition between the electronic pen and the receiver section.
Figure 6:
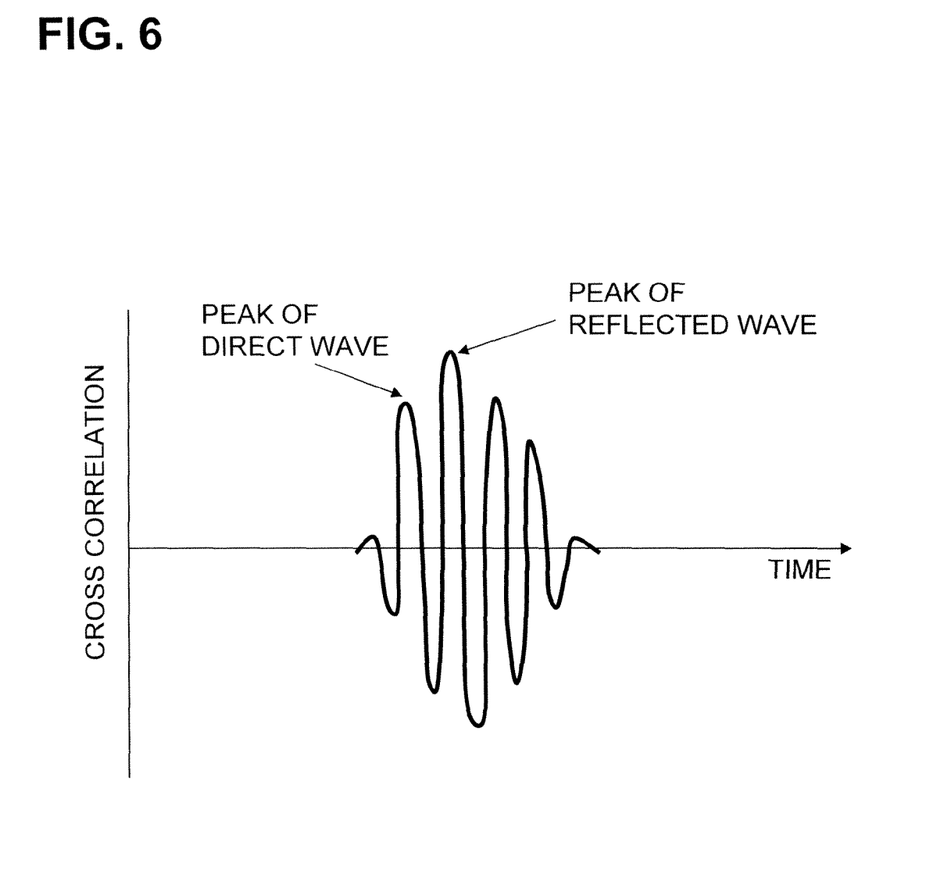
FIG. 6 is a graph showing an example of correlation data under a state in which the electronic pen is tilted.

With the method described above, plotting by the electronic pen may be made based on measurement of the ultrasonic wave propagation time which is essential. FIGS. 4A to 4C schematically show the relative disposition of the electronic pen 1 and the receiver section 3. An ultrasonic wave is radiated from the ultrasonic wave transmitter 104, provided at the foremost part of the electronic pen 1, towards the ultrasonic wave receiver 201 of the receiver section 3.

It is noted that, if the principal direction of radiation of the ultrasonic wave is horizontal, as shown in FIG. 4A, the ultrasonic wave receiver 201 receives an ultrasonic wave of the maximum sound pressure. Hence, time hysteresis data of the value of correlation is of a waveform shown in FIG. 5. If the peak detection is performed in this state, the time of incoming of the ultrasonic wave can be identified with ease. However, in reality, the principal direction of radiation of the ultrasonic wave is deviated from the horizontal direction, as shown in FIGS. 4B and 4C. The time hysteresis data of the correlation value derived from the received ultrasonic wave is of a waveform shown in FIG. 6, in which a direct wave from the ultrasonic wave transmitter 104 is superposed on its reflected wave. In this case, the direction of the maximum sound pressure of the ultrasonic wave detected by the ultrasonic wave receiver 201 is that of the reflected wave. Hence, peak detection in this state leads to an error in measurement of the actual incoming time of the ultrasonic wave. In particular, in the vicinity of the ultrasonic wave transmitter 104, the reflected wave exhibits a high sound pressure, which is also varied appreciably with the types of the material of the reflection surface. The reflected wave at an edge of an ultrasonic transmitting means (electronic pen 1) is not of a problem under the normal use state. However, in case the electronic pen 1 is inclined in the manner shown in FIG. 4B, the reflected wave tends to be a predominant ultrasonic wave arriving at the ultrasonic wave receiver 201.

Figure 7:
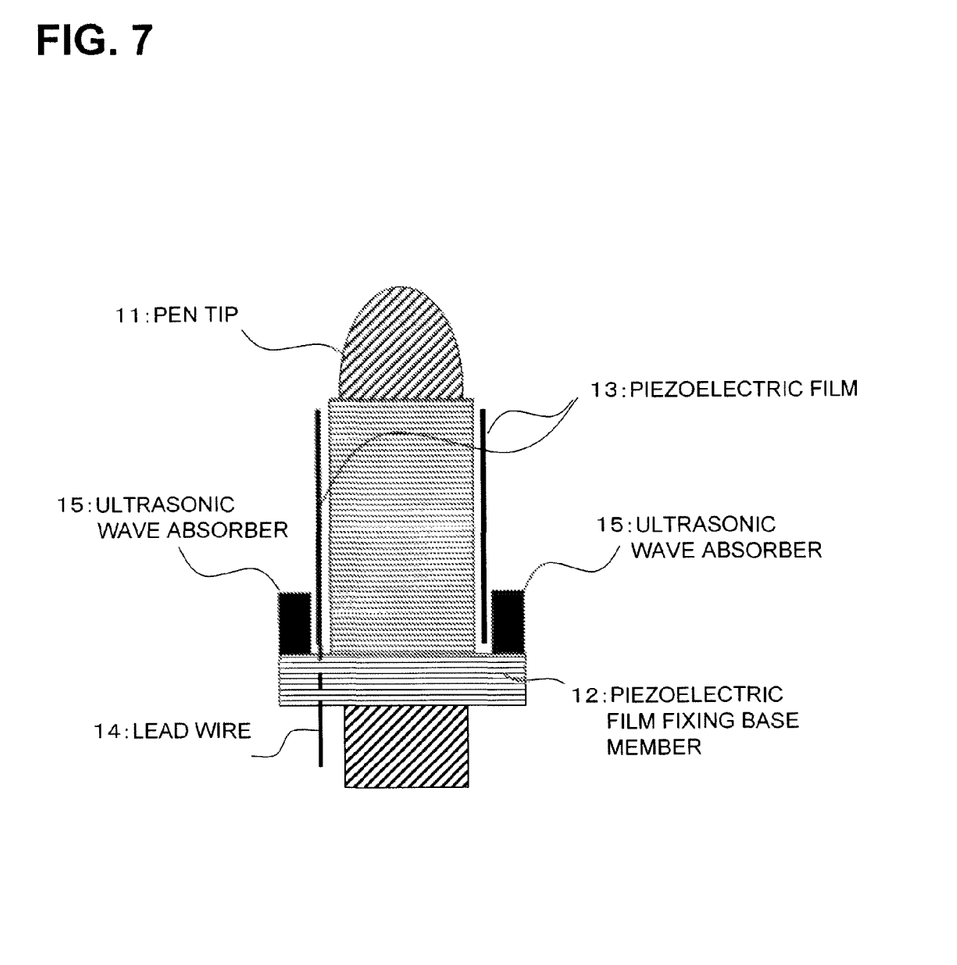
FIG. 7 is a schematic structural view showing the foremost part of an electronic pen according to an exemplary embodiment of the present invention.

An electronic pen that suppresses the reflected wave at its edge portion will now be explained. FIG. 7 shows a structure at a foremost part of the electronic pen according to an exemplary embodiment of the present invention. The foremost part of the electronic pen includes a cylindrically-shaped pen tip 11, having a rounded upper end, and a cylindrically-shaped piezoelectric film fixing base member 12 having an outwardly swollen, (i.e., enlarged diameter) lower end portion. The foremost part of the electronic pen also includes a cylindrically-shaped piezoelectric film 13, a lead wire 14 and a cylindrically-shaped ultrasonic wave absorber 15. The piezoelectric film fixing base member 12 has the pen tip 11 within its inner portion and holds the piezoelectric film 13 on its outer portion. The ultrasonic wave absorber 15 has its lower end resting on the piezoelectric film fixing base member 12 in an area outside the piezoelectric film 13. The lead wire 14 is connected to one end of the piezoelectric film 13 and passed through the interior of the piezoelectric film fixing base member 12 so as to be led out downwards.

In such structure of the electronic pen 1, it is possible to suppress reflected waves from the piezoelectric film fixing base member 12, due to presence of the ultrasonic wave absorber 15, even though the electronic pen is in an inclined position. Similar beneficent effects may be obtained in case the piezoelectric film fixing base member is itself formed of an ultrasonic wave absorbing material. Furthermore, if a foaming material or fibous material is used as a material for the ultrasonic wave absorber 15, sufficient effects may be expected in damping the reflected wave of the ultrasonic wave. Since the reflected wave of the ultrasonic wave may be damped in this manner effectively to allow for accurate speedy measurement of the ultrasonic wave propagation time, plotting may be made smoothly and speedily with the electronic pen.

To drive the cylindrically-shaped piezoelectric film 13, it is necessary to provide the lead wire 14 that supplies electric power to the piezoelectric film 13. In this case, to make the entire piezoelectric film sufficiently soft and flaccid, the piezoelectric material is itself formed of PVDF about tens of microns thick, while polyethylene (PE) or polypropylene (PP) holding the piezoelectric material is several microns thick. Hence, the electrodes that apply voltage to both sides of the piezoelectric material is also formed in most cases as a thin film. To provide for a sufficient strength of the thin film electrode lead wires, they have to be of a certain width. Depending on the manner of fixing the thin film lead wire(s) 14, the ultrasonic wave, radiated due to the oscillations of the piezoelectric film 13, cease to be axis-symmetrical in the directivity and sound pressure, resulting in differential plotting (or depicting) performance depending on how the pen is gripped by hand. Since the ultrasonic wave absorber 15 is formed and disposed cylindrically on the side of the lead wire 14 relative to the cylindrically-shaped piezoelectric film 13, it is possible in this case to provide for uniform oscillating states of the cylindrically-shaped piezoelectric film 13 with respect to the axis-symmetrical direction. Hence, the stabilized plotting performance required of the electronic pen may be assured. It is noted that, if the cylindrically-shaped piezoelectric film 13 is contacted with the ultrasonic wave absorber 15 arranged on its outer side, the ultrasonic wave radiation may further be improved in uniformity, despite the fact that the amount of ultrasonic wave radiation is decreased.

Figure 8:
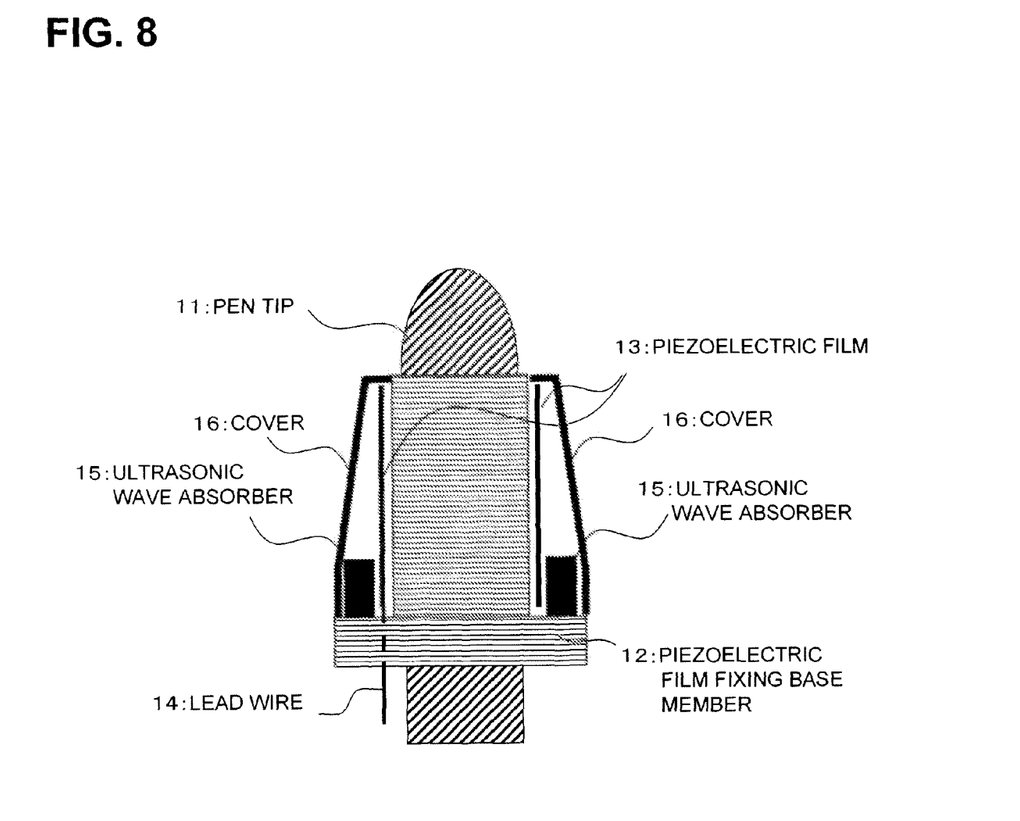
FIG. 8 is another schematic structural view showing the foremost part of an electronic pen according to another exemplary embodiment of the present invention.

Similar beneficent results may be expected by a cover 16 for protecting the piezoelectric film 13, and by interposing the ultrasonic wave absorber 15 between the cover 16 and the piezoelectric film 13, as shown in FIG. 8.

Although the electronic pen is taken up as an example for illustration, the present system may be applied to a robot system in which an obstacle avoiding behavior of a robot may be controlled by calculating the distance from the robot to the obstacle. In this case, the ultrasonic wave transmitter and the receiver section would be installed on the obstacle and on the robot, respectively. The present system may also be applied to a medical or nursing system in which the ultrasonic wave transmitter is fitted on a patient to identify (locate) his/her site.

Although the description has been made of preferred exemplary embodiments of the present invention, such exemplary embodiments are given only by way of illustration and are not intended to limit the scope of the present invention. That is, a wide variety of variations or modifications particularly including selections or combinations of various elements disclosed may be made by those skilled in the art. These variations or modifications may, of course, be included within the scope of the present invention.

EXPLANATION OF SYMBOLS 1 electronic pen
2 transmitter section
3 receiver section
10 switch
11 pen tip
12 piezoelectric film fixing base member
13 piezoelectric film
14 lead wire
15 ultrasonic wave absorber
16 cover
101 control circuit
102 M-sequence generating circuit
103 ultrasonic wave driving circuit
104 ultrasonic wave transmitter
105 infrared driving circuit
106 infrared transmitter
201 ultrasonic wave receiver
202 sampling circuit
203 infrared receiver
204 detection circuit
205 memory
206 data processing circuit

What is claimed is:

1. An ultrasonic wave transmitter device, comprising
an ultrasonic wave driving circuit that modulates an ultrasonic wave based on a pseudorandom signal to generate an ultrasonic wave driving signal; and
an ultrasonic wave transmitter, that driven by the ultrasonic wave driving signal sends out an ultrasonic wave signal of a frequency higher than a fundamental frequency of the ultrasonic wave driving signal;
the ultrasonic wave transmitter including a cylindrically-shaped piezoelectric or magnetostrictive element that sends out the ultrasonic wave signal, and an ultrasonic wave absorber that covers part of a base member that holds the piezoelectric or magnetostrictive element.

2. The ultrasonic wave transmitter device according to claim 1, wherein
the ultrasonic wave absorber comprises a foaming material.

3. The ultrasonic wave transmitter device according claim 2, wherein
the ultrasonic wave absorber is formed in a cylindrical form surrounding the piezoelectric or magnetostrictive element.

4. The ultrasonic wave transmitter device according to claim 2, wherein
the ultrasonic wave absorber is arranged on a connecting side of at least one lead wire that delivers electric power for driving the piezoelectric or magnetostrictive element.

5. The ultrasonic wave transmitter device according to claim 2, wherein
the ultrasonic wave absorber is arranged in contact with the piezoelectric or magnetostrictive element.

6. The ultrasonic wave transmitter device according to claim 1, wherein
the ultrasonic wave absorber comprises a fibrous material.

7. The ultrasonic wave transmitter device according claim 6, wherein
the ultrasonic wave absorber is formed in a cylindrical form surrounding the piezoelectric or magnetostrictive element.

8. The ultrasonic wave transmitter device according to claim 6, wherein
the ultrasonic wave absorber is arranged on a connecting side of at least one lead wire that delivers electric power for driving the piezoelectric or magnetostrictive element.

9. The ultrasonic wave transmitter device according to claim 1, wherein
the ultrasonic wave absorber is formed in a cylindrical form surrounding the piezoelectric or magnetostrictive element.

10. The ultrasonic wave transmitter device according to claim 9, wherein
the ultrasonic wave absorber is arranged on a connecting side of at least one lead wire that delivers electric power for driving the piezoelectric or magnetostrictive element.

11. The ultrasonic wave transmitter device according to claim 1, wherein
the ultrasonic wave absorber is arranged on a connecting side of at least one lead wire that delivers electric power for driving the piezoelectric or magnetostrictive element.

12. The ultrasonic wave transmitter device according to claim 1, wherein
the ultrasonic wave absorber is arranged in contact with the piezoelectric or magnetostrictive element.

13. The ultrasonic wave transmitter device according to claim 1, wherein
the ultrasonic wave absorber is arranged in contact with about one-half or less of a height of the piezoelectric or magnetostrictive element.

14. The ultrasonic wave transmitter device according to claim 1, further comprising
a cover; wherein
the ultrasonic wave absorber is arranged between the piezoelectric or magnetostrictive element and the cover.

15. The ultrasonic wave transmitter device according to claim 1, wherein,
the pseudorandom signal comprises an M-sequence signal.

16. The ultrasonic wave transmitter device according to claim 1, wherein,
the ultrasonic wave driving signal has a frequency of approximately one-half a resonance frequency of the piezoelectric or magnetostrictive element.

17. An ultrasonic wave propagation time measurement system, comprising:
the ultrasonic wave transmitter device according to claim 1;
the ultrasonic wave transmitter device further including:
an electromagnetic wave transmitter that sends out an electromagnetic wave signal indicating transmitting timing;
the ultrasonic wave driving circuit modulating an ultrasonic wave, based on the pseudorandom signal, simultaneously with sending out the electromagnetic wave signal;
an electromagnetic wave receiver that detects the ultrasonic wave signal;
an ultrasonic wave receiver that detects the ultrasonic wave sent out; and
a data processing circuit; the data processing circuit calculating a value of correlation between the ultrasonic wave signal detected and a model waveform which is the same waveform as that of the ultrasonic wave driving signal; detecting a principal peak value of the value of correlation calculated; and calculating ultrasonic wave propagation time from a time point of detection of the electromagnetic wave signal and a time point of detection of the principal peak value.

18. The ultrasonic wave propagation time measurement system according to claim 17, wherein,
the electromagnetic wave transmitter, the ultrasonic wave driving circuit and the ultrasonic wave transmitter are built in an electronic pen.

19. The ultrasonic wave propagation time measurement system according to claim 17, wherein
the electromagnetic wave signal comprises an infrared signal.

* * * * *